(12) United States Patent
Martins et al.

(10) Patent No.: US 12,244,470 B2
(45) Date of Patent: Mar. 4, 2025

(54) MACHINE-LEARNING MODELS AND APPARATUS

(71) Applicant: Telefonaktiebolaget LM Ericsson (publ), Stockholm (SE)

(72) Inventors: Jean Paulo Martins, Indaiatuba (BR); Ricardo da Silva Souza, Indaiatuba (BR); Klaus Raizer, Indaiatuba (BR); Alberto Hata, Campinas SP (BR); Amadeu Do Nascimento Junior, Indaiatuba (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/252,765

(22) PCT Filed: Nov. 13, 2020

(86) PCT No.: PCT/EP2020/082139
§ 371 (c)(1),
(2) Date: May 12, 2023

(87) PCT Pub. No.: WO2022/100856
PCT Pub. Date: May 19, 2022

(65) Prior Publication Data
US 2024/0007359 A1 Jan. 4, 2024

(51) Int. Cl.
*G06F 15/173* (2006.01)
*G06N 20/00* (2019.01)
(Continued)

(52) U.S. Cl.
CPC ............. *H04L 41/16* (2013.01); *G06N 20/00* (2019.01); *H04L 41/145* (2013.01)

(58) Field of Classification Search
CPC ........ H04L 41/16; H04L 41/145; G06N 20/00
(Continued)

(56) References Cited

U.S. PATENT DOCUMENTS

| | | | |
|---|---|---|---|
| 6,594,246 B1 * | 7/2003 | Jorgensen | ........... H04L 63/0272 370/468 |
| 6,640,248 B1 * | 10/2003 | Jorgensen | ............... H04W 8/04 370/328 |
| 2019/0318254 A1 | 10/2019 | Lobete et al. | |
| 2020/0174471 A1 * | 6/2020 | Du | ....................... G08G 1/0129 |

(Continued)

FOREIGN PATENT DOCUMENTS

| | | | | |
|---|---|---|---|---|
| CN | 111919423 A | * | 11/2020 | ........... H04L 47/127 |
| JP | 2019175058 A | | 10/2019 | |

(Continued)

OTHER PUBLICATIONS

International Search Report and Written Opinion dated Jul. 30, 2021 for International Application No. PCT/EP2020/082139 filed Nov. 13, 2020; consisting of 17 pages.

(Continued)

*Primary Examiner* — Liang Che A Wang
(74) *Attorney, Agent, or Firm* — Weisberg I.P. Law, P.A.

(57) ABSTRACT

Methods and apparatus for implementing reinforcement learning are provided. A method in a client node that instructs actions in an environment in accordance with a policy includes identifying one or more critical states of the environment for which a current policy provides unreliable actions. The method further includes initiating transmission to a server of a retraining request, the retraining request having information relating to the one or more critical states. The method further includes receiving a new policy from the server, wherein the new policy is generated by the server using reinforcement learning based on the information relating to the one or more critical states, and instructing actions in the environment in accordance with the new policy.

25 Claims, 13 Drawing Sheets

(51) Int. Cl.
*H04L 41/14* (2022.01)
*H04L 41/16* (2022.01)

(58) Field of Classification Search
USPC .......................................... 709/201, 223, 224
See application file for complete search history.

(56) References Cited

U.S. PATENT DOCUMENTS

| 2020/0302322 A1* | 9/2020 | Tukiainen | ................ G06N 7/01 |
| 2022/0092607 A1* | 3/2022 | Jeske | ................... G06Q 30/018 |

FOREIGN PATENT DOCUMENTS

| JP | 2020154785 A | 9/2020 |
| WO | 2019149949 A1 | 8/2019 |

OTHER PUBLICATIONS

Ramos, F. et al.; BayesSim: adaptive domain randomization via probabilistic inference for robotics simulators; arXiv:1906.01728v1; Jun. 4, 2019; consisting of 10 pages.

Tobin, J. et al.; Domain Randomization for Transferring Deep Neural Networks from Simulation to the Real World; 2017 IEEE/RSJ International Conference on Intelligent Robots and Systems (IROS); Sep. 24-28, 2017; Vancouver, BC, Canada; consisting of 8 pages.

Burda, Y., et al.; Exploration by Random Network Distillation; arXiv: 1810.12894v1; Oct. 30, 2018; consisting of 17 pages.

Japanese Notice of Allowance and English machine translation dated Jul. 16, 2024 Patent Application No. 2023-528531, consisting of 6 pages.

* cited by examiner

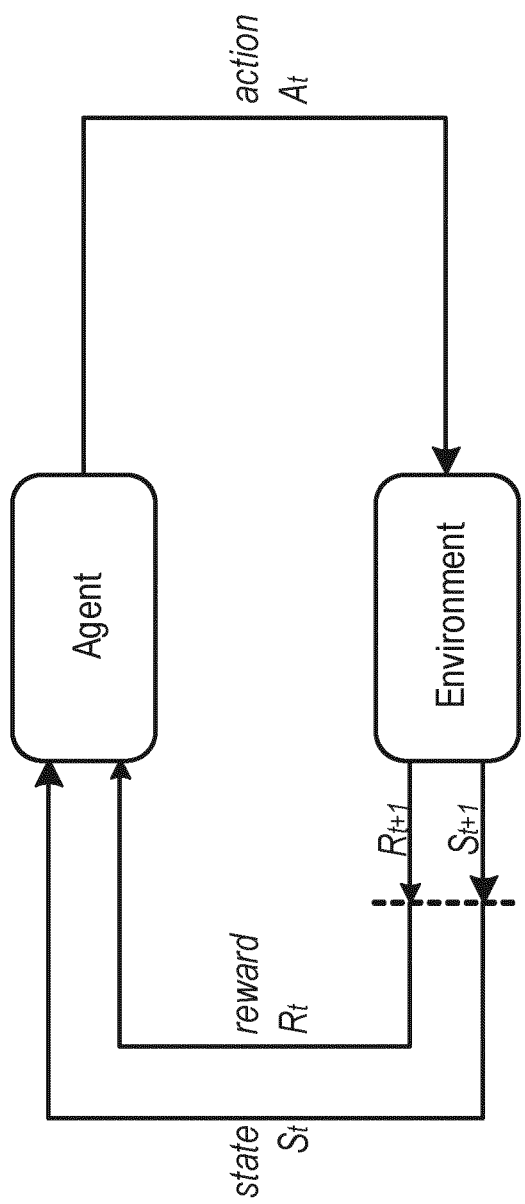

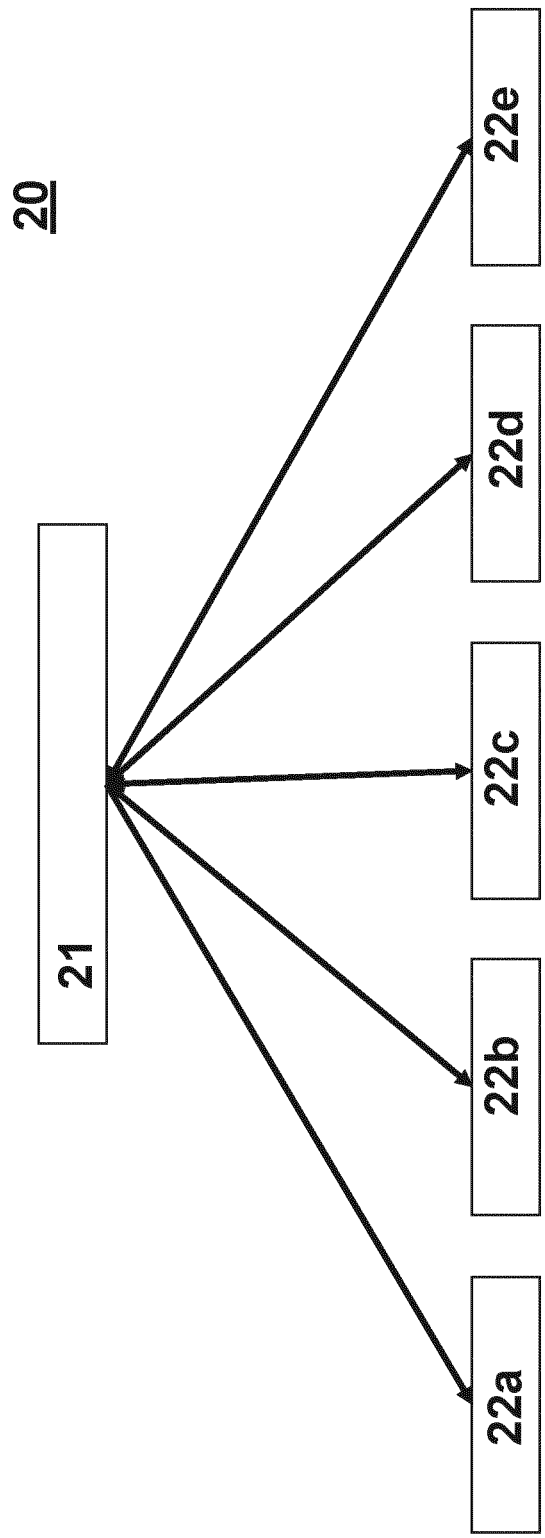

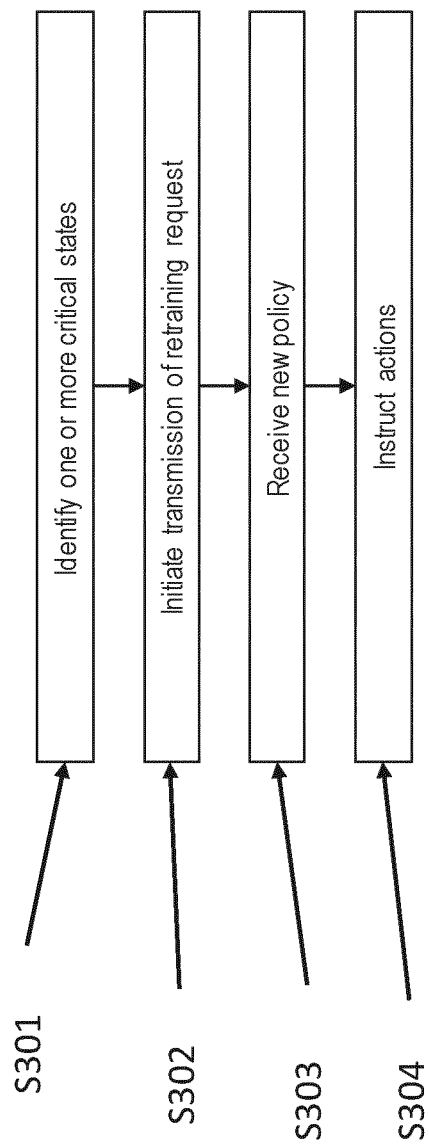

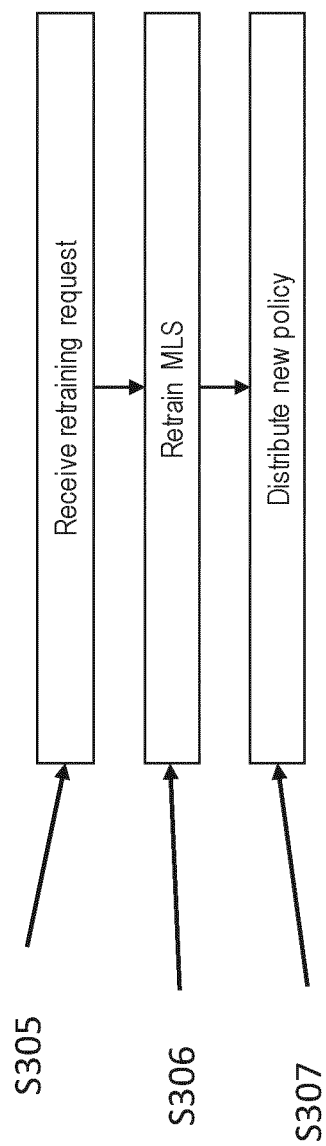

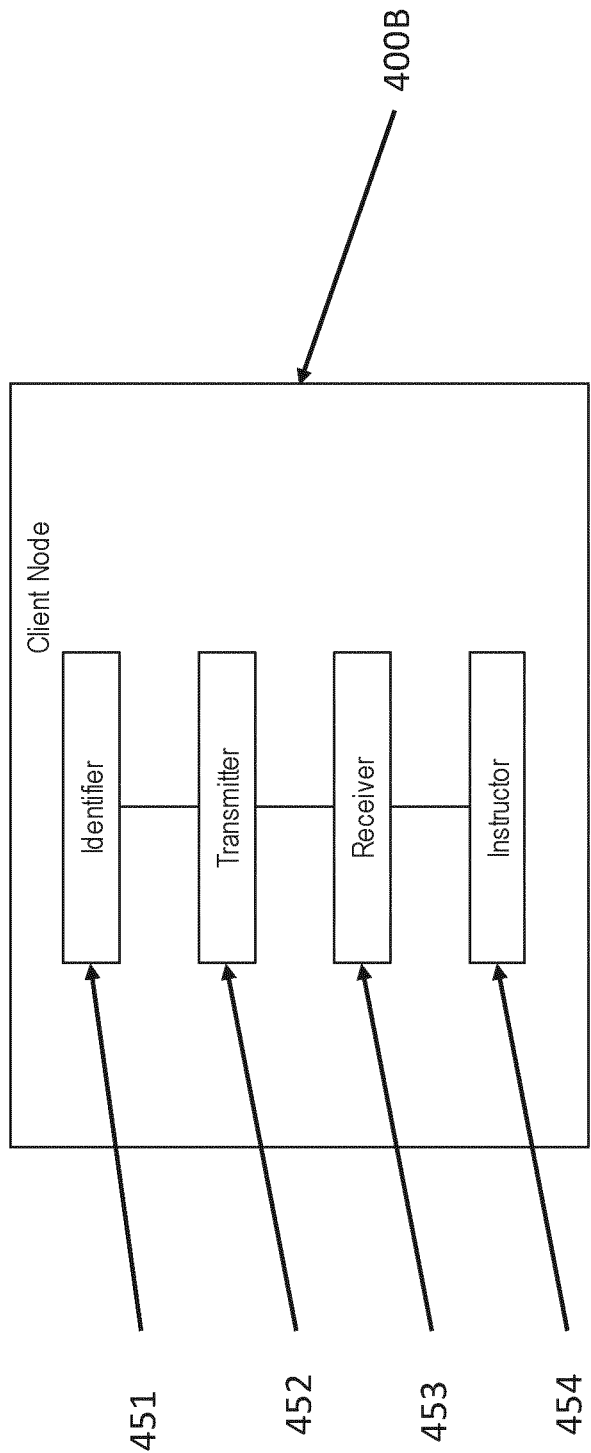

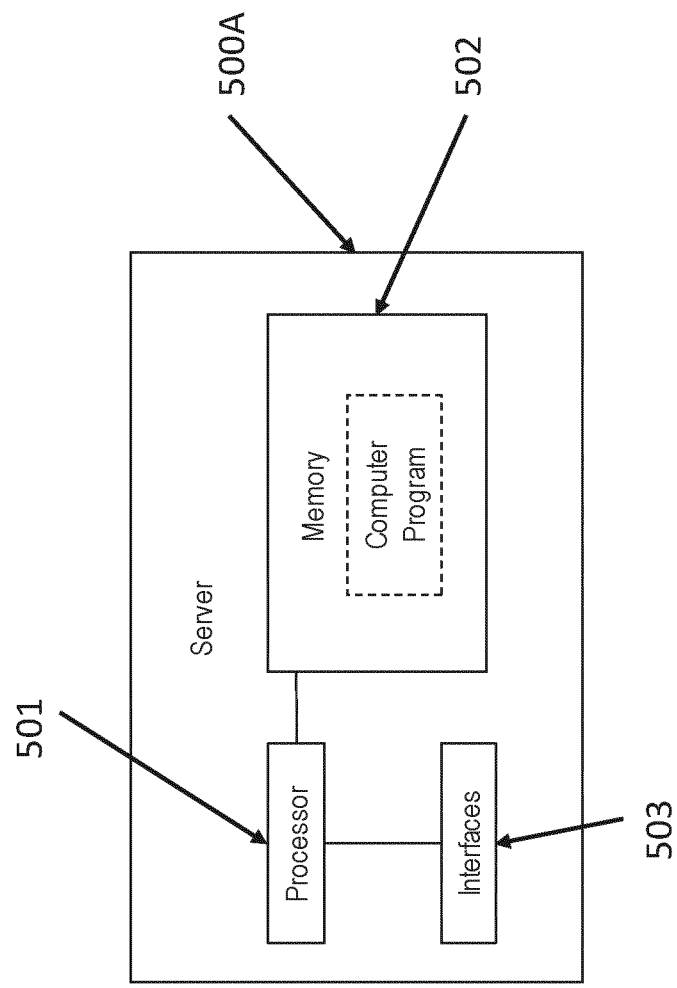

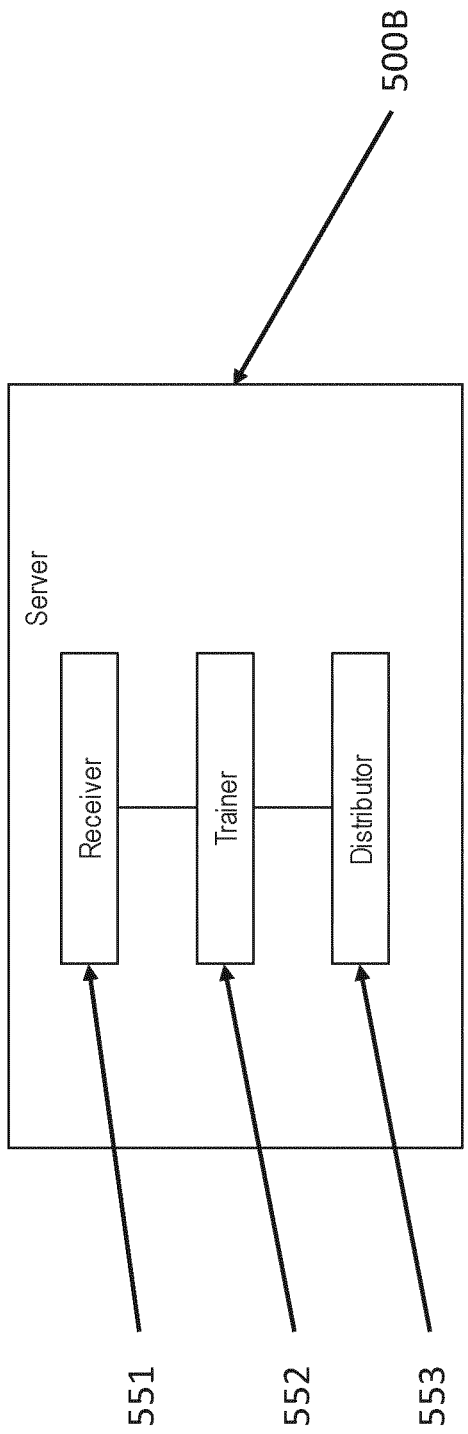

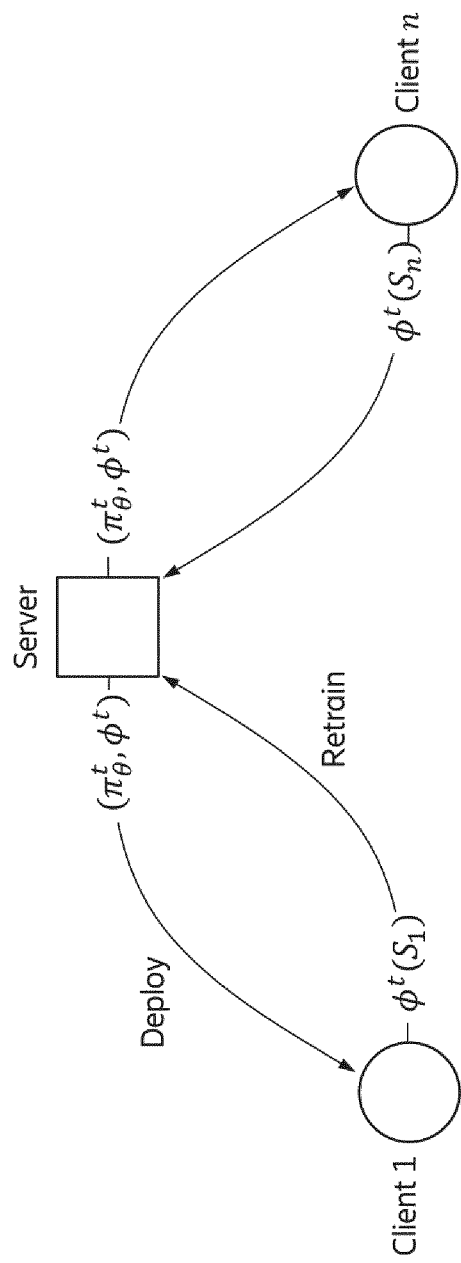

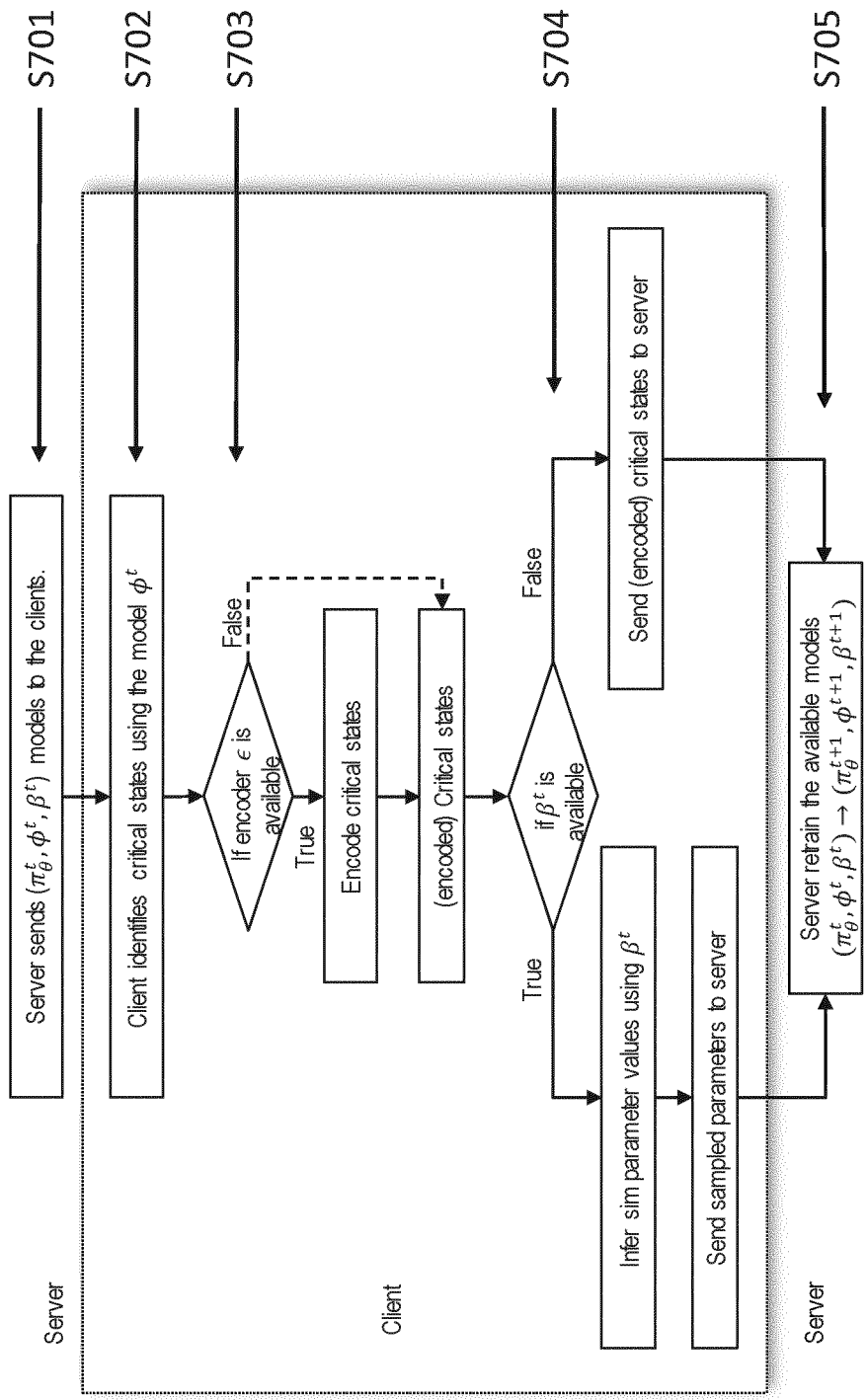

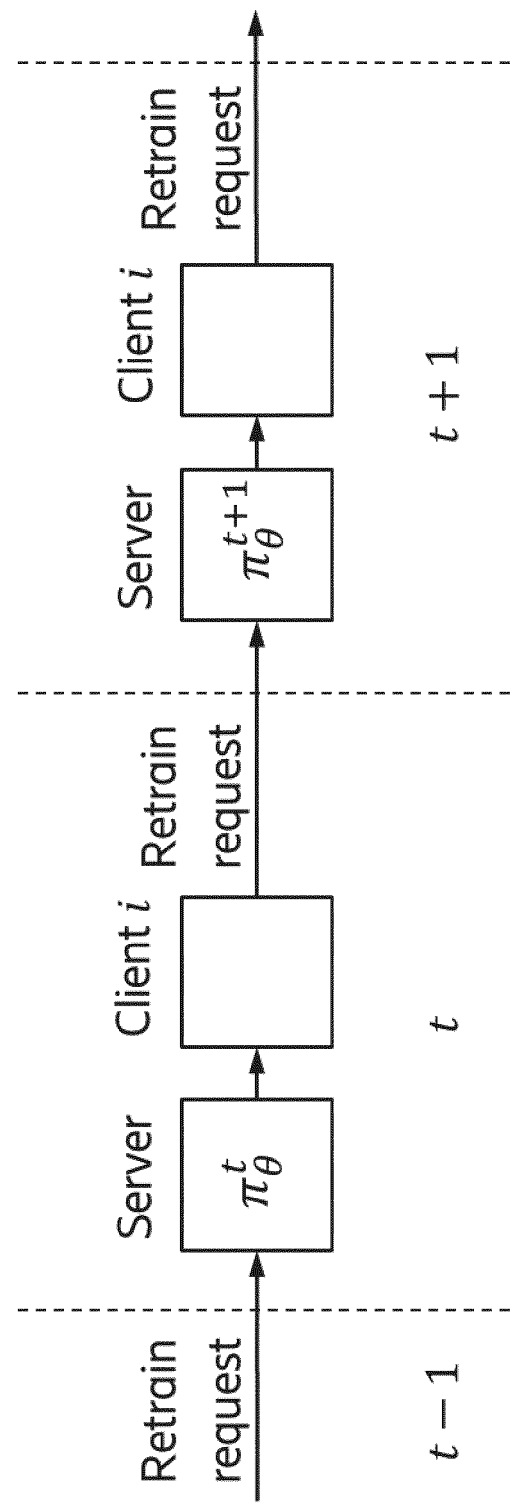

MACHINE-LEARNING MODELS AND APPARATUS

CROSS-REFERENCE TO RELATED APPLICATION

This application is a Submission Under 35 U.S.C. § 371 for U.S. National Stage Patent Application of International Application Number: PCT/EP2020/082139, filed Nov. 13, 2020 entitled "MACHINE-LEARNING MODELS AND APPARATUS," the entirety of which is incorporated herein by reference.

TECHNICAL FIELD

Embodiments described herein relate to methods and apparatus for implementing machine-learning models, in particular for implementing machine learning models developed using Reinforcement Learning (RL).

BACKGROUND

Management of complex systems, such as telecommunications networks, vehicular traffic management systems, and so on, is an ever-increasing challenge. In order to meet this challenge reinforcement learning (RL) techniques that enable effectiveness and adaptiveness may be implemented.

RL allows a Machine Learning System (MLS) to learn by attempting to maximise an expected cumulative reward for a series of actions utilising trial-and-error. RL agents (that is, a system which uses RL in order to improve performance in a given task over time) are typically closely linked to the system (environment) they are being used to model/control, and learn through experiences of performing actions that alter the state of the environment.

FIG. 1 illustrates schematically a typical RL system. In the architecture shown in FIG. 1, an agent receives data from, and transmits actions to, the environment which it is being used to model/control. For a time t, the agent receives information on a current state of the environment $S_t$. The agent then processes the information $S_t$, and generates an action to be taken $A_t$. This action is then transmitted back to the environment and put into effect. The result of the action is a change in the state of the environment with time, so at time t+1 the state of environment is $S_{t+1}$. The action also results in a (numerical, typically scalar) reward $R_{t+1}$, which is a measure of effect of the action $A_t$ resulting in environment state $S_{t+1}$. The changed state of the environment $S_{t+1}$ is then transmitted from the environment to the agent, along with the reward $R_{t+1}$. FIG. 1 shows reward $R_t$ being sent to the agent together with state $S_t$; reward $R_t$ is the reward resulting from action $A_{t-1}$, performed on state $S_{t-1}$. When the agent receives state information $S_{t+1}$ this information is then processed in conjunction with reward $R_{t+1}$ in order to determine the next action $A_{t+1}$, and so on. The actions are selected by the agent from actions available to the agent with the aim of maximising the cumulative reward.

For some complex systems, RL techniques may be usefully combined with distributed learning techniques to provide a distributed reinforcement learning (DRL) architecture. ML models may be trained at a centralized network node, such as a server, using a centralized data set. The trained ML models may then be used to generate policies, which may map observations to actions (or action distributions) using parameterized functions and which can be deployed to client nodes for implementation. In DRL architectures, the centralised network node and client nodes may collectively act as a ML agent; the centralised network node and client nodes act together to use RL to improve performance in a given task.

The use of RL itself may cause issues in safety-sensitive real-world applications. In general, artificial agents can be trained in simulated environments by RL to find policies that optimize some objective function or bring the system to a predetermined goal state. Although simulators provide safe training environments where RL agents can explore their actions and learn, there is no guarantee that performance in simulation translates to a similar performance in practice. The leading cause of such an issue is the lack of guarantees that the state distributions observed during training (that is, the environment states used to train a ML model) are equal to those observed in production (that is, the environment states for which the policies generated by the ML model are implemented); this issue may be referred to as the simulation-to-reality gap.

When the training distribution use to train a ML model differs from the production distribution in which the policies from the ML model are to be deployed, the actions taken by the client node based on the policies cannot be trusted. Where policies are applied to environment states which differ from those used to train the ML model, this may result in suggested actions which do not positively impact the environment state, and may negatively impact the environment state. Using the example of a telecommunications network, the application of policies to network states which differ from those used to train a ML model responsible for generating said policies could have negative impacts such as increasing network congestion, decreasing reliability, and so on.

Differences between training and production distributions could be circumvented by simply training RL agents directly in the real system. However, for safety-sensitive applications, training in the real system is typically unsafe and/or infeasible, and is therefore rarely a viable option. Accordingly, where DRL is used, ensuring that policies implemented by client nodes reliably respond to environment states encountered by the client nodes is an ongoing issue.

"Domain randomization for transferring deep neural networks from simulation to the real world," by Tobin, J. et al., 2017 IEEE/RSJ International Conference on Intelligent Robots and Systems (IROS), Vancouver, B C, 2017, pp. 23-30, doi: 10.1109/IROS.2017.8202133, suggests domain randomization as a choice for dealing with generalization issues. Sampling simulator parameters from an appropriate distribution may allow ML models to be trained using a greater variety of environmental situations, thereby facilitating the preparation of policies using the trained ML models that are capable of providing reliable actions in a greater variety of environment states in production. Some applications of domain randomization learn the posterior distribution of the parameters given data extracted during training. Learning the posterior distribution allows sample simulator parameters that would induce a particular data distribution to be obtained. Ideally, appropriate simulator parameters that would bring training and production data distributions closer would be sampled.

SUMMARY

It is an object of the present disclosure to provide methods, apparatus and computer-readable media which at least partially address one or more of the challenges discussed above. In particular, it is an object of the present disclosure to facilitate the implementation of RL, supporting the continual updating of policies implemented in client nodes following the deployment of the client nodes.

The present disclosure provides a method of operation of a client node for implementing RL, wherein the client node instructs actions in an environment in accordance with a policy. The method comprises identifying one or more critical states of the environment for which a current policy provides unreliable actions, and initiating transmission to a server of a retraining request where the retraining request comprising information relating to the one or more critical states. The method further comprises receiving from the server a new policy, wherein the new policy is generated by the server using RL based on the information relating to the one or more critical states, and instructing actions in the environment in accordance with the new policy. By facilitating the identification by the client node of critical states, the method allows the client node to detect when the policies it relies upon may no longer be reliable. The client node is also able to provide to the server information which allows the server to update policies; the updated policies may then be provided to the client node to ensure reliable actions are instructed.

In some aspects of embodiments, critical states of the environment may be identified based on observations of the environment, in particular via comparisons of the environment with environment states used to generate the current policy. In this way, the client node may reliably identify critical states using knowledge of the states used to generate the current policy. Techniques such as Random Network Distillation (RND) techniques may be particularly well suited for use in the comparison.

In some aspects of embodiments the client node may provide to the server encrypted samples of identified critical states, or inferred simulation parameters based on the identified critical states. Both of these options may help provide privacy protection for sensitive data relating to critical states.

Some aspects of embodiments provide a method of operation of a system comprising the client node and the server for implementing RL. The server may receive the retraining request from the client node as discussed herein, and may retrain a MLS responsible for the current policy, based on the information relating to the one or more critical states in the retraining request, to generate the new policy. The server may then distribute the new policy generated by the MLS to the client node. By concentrating the generation of new policies at the server, fewer computational resources may be required at the client nodes.

The present disclosure also provides a client node for implementing RL, wherein the client node is configured to instruct actions in an environment in accordance with a policy. The client node comprises processing circuitry and a memory containing instructions executable by the processing circuitry. The client node is operable to identify one or more critical states of the environment for which a current policy provides unreliable actions, and initiate transmission to a server of a retraining request, the retraining request comprising information relating to the one or more critical states. The client node is further operable to receive from the server a new policy, wherein the new policy is generated by the server using RL based on the information relating to the one or more critical states and instruct actions in the environment in accordance with the new policy. Some benefits provided by the client node may be as discussed above in the context of the method performed by a client node.

Some aspects of embodiments provide a system comprising the client node and further comprising a server. The server comprises processing circuitry and a memory containing instructions executable by the processing circuitry. The server is operable to receive the retraining request from the client node, and retrain a machine learning system (MLS) responsible for the current policy, based on the information relating to the one or more critical states in the retraining request, to generate the new policy. The server is further operable to distribute the new policy generated by the MLS to the client node. Some benefits provided by the server may be as discussed above in the context of the method performed by a server.

BRIEF DESCRIPTION OF DRAWINGS

The present disclosure is described, by way of example only, with reference to the following figures, in which:—

FIG. 1 is a schematic diagram of a RL system;

FIG. 2 is a schematic overview of a DRL system;

FIG. 3A is a flowchart of a method performed by a client node in accordance with aspects of embodiments;

FIG. 3B is a flowchart of a method performed by a server in accordance with aspects of embodiments;

FIGS. 4A and 4B are schematic diagrams of client nodes in accordance with aspects of embodiments;

FIGS. 5A and 5B are schematic diagrams of servers in accordance with aspects of embodiments;

FIGS. 6A, 6B and 6C are process diagrams of examples of policy update procedures in accordance with aspects of embodiments;

FIG. 7 is a flowchart providing an overview of policy update procedures in accordance with aspects of embodiments; and FIG. 8 is a schematic diagram of the iterative process update procedure.

DETAILED DESCRIPTION

Figure 4A:
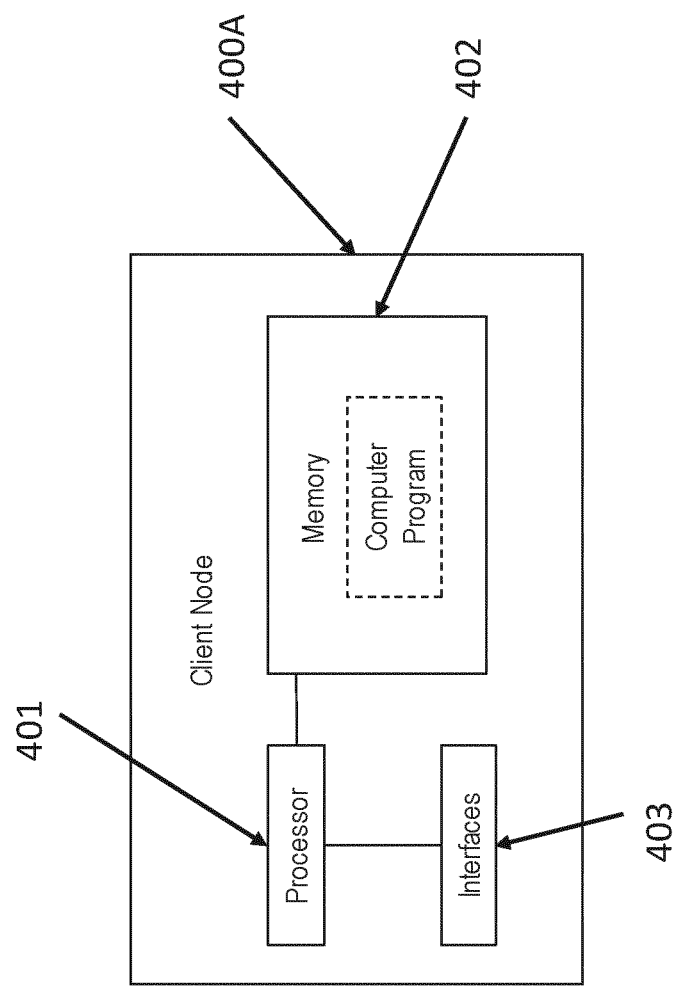

For the purpose of explanation, details are set forth in the following description in order to provide a thorough understanding of the embodiments disclosed. It will be apparent, however, to those skilled in the art that the embodiments may be implemented without these specific details or with an equivalent arrangement.

The use of adaptive domain randomization techniques may assist in bridging the simulation-to-reality gap. Given samples of real-world data, adaptive domain randomization techniques allow the training of a ML agent in a safe simulation environment, wherein the simulation environment has a data distribution that is close to the real world data distribution target. However, in order to provide a more complete solution to the simulation-to-reality gap problem in the context of distributed RL architectures with centralized training, several other issues remain to be addressed. In some application scenarios, real-world data samples are not readily available. Different deployments (in client nodes) of the same policy may observe different data distributions, and extraneous factors might induce data distributions experienced by client nodes to change over time. Further, in some systems, it may not be viable to transfer the whole set of observed data to a centralized server, and even where such a transfer is possible, privacy constraints might apply when transferring observed data to a centralized server.

Aspects of embodiments relate to the use of distributed RL, wherein training takes place in a server, and deployment of the resulting policy occurs at one or more independent client nodes, where its inference defines the behaviour of the client nodes. Aspects of embodiments may allow client nodes to adapt to the production data distribution before their activation, and may also allow monitoring of client node observed data distributions, which in turn may facilitate continual learning. Accordingly, aspects of embodiments may help address issues relating to the simulation-to-reality gap.

Embodiments of the present disclosure provide methods of operation of a client node for implementing RL, wherein the client node instructs actions in an environment in accordance with a policy, and also methods of operation of a system comprising the client node and a server.

FIG. 2 is a schematic overview of a DRL system 20, which may perform methods in accordance with aspects of embodiments. The DRL system 20 of FIG. 2 comprises a single server 21 and a plurality of client nodes 22a, 22b, 22c, 22d and 22e (collectively referred to using the reference sign 22). The DRL system 20 of FIG. 2 shows five client nodes 22; those skilled in the art will appreciate that larger or smaller numbers of client nodes may be used. Some DRL systems may also incorporate plural servers, which may be of particular use when modelling very complex environments.

As indicated by the arrows in FIG. 2, each of the client nodes 22 may communicate with the server 21, but there are typically no direct lines of communication between client nodes 22. In some aspects of embodiments the server and the client nodes may be co-located, that is, may be contained within the same physical apparatus. However, typically the server and client nodes are located separately from one another, and communicate with one another using a suitable communication means (such as a wireless telecommunications system, wired telecommunications system, and so on). Whether or not the server and one or more of the client nodes may be co-located may depend on the trust model between the server and respective client nodes. In the embodiment shown in FIG. 2, there is trust for the server to communicate directly with each of the client nodes but not for client nodes to communicate directly with each other—privacy between client nodes but trust in the server. If the server and one or more client nodes were co-located, that would make the one or more co-located client nodes more privileged than client nodes that were not co-located.

In some aspects of embodiments the DRL system 20 may form part of a wireless communication network such as a $3^{rd}$ Generation Partnership Project (3GPP) $4^{th}$ Generation (4G) or $5^{th}$ Generation (5G) network. Where the DRL system 20 forms part of a wireless communications network, the server and client nodes may be co-located and/or may be located in suitable components of the network. In some aspects of embodiments, the server 21 may form part of a Core Network Node (CNN), and the client nodes 22 may each form part of a base station (which may be 4th Generation, 4G, Evolved Node Bs, eNB, or 5th Generation, 5G, next Generation Node Bs, gNBs, for example).

A method in accordance with aspects of embodiments is illustrated by FIG. 3A, which is a flowchart showing an operation method of a client node for implementing RL, wherein the client node instructs actions in an environment in accordance with a policy. The nature of the client node, actions, environment and policy are dependent on the specific system in which the method is used; taking the example where the environment is a telecommunications network as discussed above (or part of the same), the client node may be a base station (or may be incorporated in a base station), and the policy may cause the client node to instruct actions such as rerouting traffic in the telecommunications network, increasing network capacity, and so on. As a further example, the environment may be a traffic management system (or part of the same), the client may be the controller for one or more traffic lights, and the policy may determine the lighting sequence used for the lights to reduce congestion.

The method shown in FIG. 3A is performed by a client node. Any suitable client node may be used, for example, client node 22a, b, c, d or e of FIG. 2. FIG. 4A and FIG. 4B show further client nodes 401, 451 in accordance with aspects of embodiments. The client nodes 401, 451 may perform the method of FIG. 3A.

A method in accordance with further aspects of embodiments is illustrated by FIG. 3B, which is a flowchart showing an operation method of a server for implementing RL. As with the client node discussed above with reference to FIG. 3A, the nature of the server, actions, environment and policy are dependent on the specific system in which the method is used; taking the example where the environment is a telecommunications network as discussed above (or part of the same), the server may be a core network node (or may be incorporated in a core network node), and the policy may cause the client node to instruct actions such as rerouting traffic in the telecommunications network, increasing network capacity, and so on. As a further example, the environment may be a traffic management system (or part of the same), the server may be a central control station for the traffic management system, and the policy may determine the lighting sequence used for the lights to reduce congestion.

The method shown in FIG. 3B is performed by a server. Any suitable server may be used, for example, server 21 of FIG. 2. FIG. 5A and FIG. 5B show further servers 501, 551 in accordance with aspects of embodiments. The servers 501, 551 may perform the method of FIG. 3B.

As shown in step S301 of FIG. 3A the method comprises identifying, at a client node 401, 451, one or more critical states of the environment (for which the client node instructs actions) for which a current policy used by the client node 401, 451 provides unreliable actions. An environment state may be identified as a critical state where it differs substantially from environment states used to generate the current policy used by the client node 401, 451. A substantial difference in this context may be identified as a difference which influences the way the environment would respond to an action. As a result of the substantial difference between the critical state and the environment states used to generate the current policy, it is not certain that actions provided by the current policy would have the desired effect on the environment. Using the example wherein the environment is a telecommunications network, if the environment is in a critical state, an action proposed by a current policy with the intent of reducing packet losses may not have that effect, and may in some situations increase packet losses. As the actions proposed by the current policy when the environment is in a critical state may not have the desired effect on the environment, the actions proposed by the current policy are considered to be unreliable actions. The step of identifying one or more critical states may be performed in accordance with a computer program stored in a memory 402, executed by a processor 401 in conjunction with one or more interfaces 403, as illustrated by FIG. 4A. Alternatively, the step of identifying one or more critical states may be performed by an identifier 451 as shown in FIG. 4B.

Critical states may be identified in any suitable way, for example, by observations of the environment state, potentially in conjunction with comparisons of the observed environment state with environment states used to generate the current policy. Any suitable technique may be used to perform comparisons between observed environment state with environment states used to generate the current policy. Examples of suitable techniques are those based on Random Network Distillations (RNDs). RNDs are discussed in greater detail in "Exploration by Random Network Distillation" by Burda, Y. et al., available at https://arxiv.org/abs/1810.12894 as of 9 Nov. 2020.

In order to implement critical state identification techniques, such as RND techniques, the information used to train/retrain an MLS to generate a policy (to be used by a client node), may also be used to train/retrain a state classification model. In the training/retraining process, the state classification model may essentially memorise the training data. The trained/retrained state classification model may then be used to classify observed environment states; the classifications may comprise "critical" and "not critical", and may in some aspects of embodiments include further sub classifications. The exact nature of the classifications may depend on the environment (telecommunications network, traffic management system, and so on) that the client node provides actions for.

In some aspects of embodiments the state classification model, once trained/retrained, may be distributed to one or more client nodes connected to a server 501, 551, potentially to all client nodes connected to the server 501, 551. Where the state classification model is distributed to one or more of the client nodes, these client nodes may then use the model (at the client node) to identify critical states. Alternatively, for client nodes that are not provided with the state classification model (for example, where the model is retained at the server), a sample of observed environment states may periodically be sent to the server, such that the server may use the state classification model to provisionally identify critical states, such provisional identification being confirmed by the client nodes.

In addition to or alternatively to identification of critical states using observations of the environment and/or state classification models, aspects of embodiments may utilise centralised information provided by the server to identify critical states. Any useful centralised information may be provide to the client nodes for use in identifying critical states. As an example of such information, it may be the case that training states of an environment in a particular implementation have values of a certain parameter within a given range; this range of the certain parameter could be provided to the client nodes to facilitate simple identification of critical states (states where the certain parameter is outside the given range).

Initially, client nodes may be provided with a policy by a server. Alternatively, the client nodes may be pre-loaded with a policy before or during deployment, including before the client nodes are connected to the server. The exact means by which the initial policy is provided to the client nodes may differ between nodes in a system, and in any event may be system dependent. The policy may be applied by the client nodes until one or more critical states are identified.

When one or more critical states have been identified, the client node may initiate transmission of a retraining request, as indicated in step S302 of FIG. 3A. The step of triggering the transmission of a retraining request may be performed in accordance with a computer program stored in a memory 402, executed by a processor 401 in conjunction with one or more interfaces 403, as illustrated by FIG. 4A. Alternatively, the step of triggering the transmission of a retraining request may be performed by a transmitter 452 as shown in FIG. 4B. The client node may initiate transmission with the actual transmitting being performed by a further component (such as a further node), or alternatively the client node may initiate and execute transmission itself. The retraining request may be triggered by the identification of a single critical state, or when the number of observed critical states exceeds a threshold (which may be a predetermined threshold, may be set by the client node, may be set by the server, and so on). The retraining request comprises information relating to the one or more identified critical states; when the retraining request is received by the server as shown in step S305 of FIG. 3B, the information may be used by the server in retraining a MLS to generate a new policy (see step S306 of FIG. 3B). The step of receiving a retraining request may be performed in accordance with a computer program stored in a memory 502, executed by a processor 501 in conjunction with one or more interfaces 503, as illustrated by FIG. 5A. Alternatively, the step of receiving a retraining request may be performed by a receiver 551 as shown in FIG. 4B.

The server may initiate retraining of the MLS when a certain number of retraining requests are received from client nodes, wherein the retraining may use information relating to the one or more critical states from some or all of the received retraining requests. Alternatively, the server may initiate retraining when a single retraining request is received, using the information from that request. The step of retraining may be performed in accordance with a computer program stored in a memory 502, executed by a processor 501 in conjunction with one or more interfaces 503, as illustrated by FIG. 5A. Alternatively, the step retraining may be performed by a trainer 552 as shown in FIG. 5B.

The nature of the information included in the retraining request varies depending on the respective capabilities of the client node and server. In some aspects of embodiments, the retraining request includes a sample of identified critical states from the client node(s). The server may use a parameter generation model based on adaptive randomisation techniques, such as a BayesSim model, $\beta^r$. BayesSim models are discussed in greater detail in "BayesSim: adaptive domain randomization via probabilistic inference for robotics simulators" by Ramos, F., Possas, R., & Fox, D., available at https://arxiv.org/abs/1906.01728 as of 9 Nov. 2020. The simulation parameter generation model may be trained (potentially using supervised learning) to output simulation parameters given a sample of observations that generated the simulation parameters. The trained model may then allow inference of simulator parameters given a sample of observations (in this case, observed critical states from client nodes). Therefore, by using a simulation parameter generation model, the server can specify simulation parameters that would induce environment states close to those identified as critical by the client nodes.

Figure 6B:
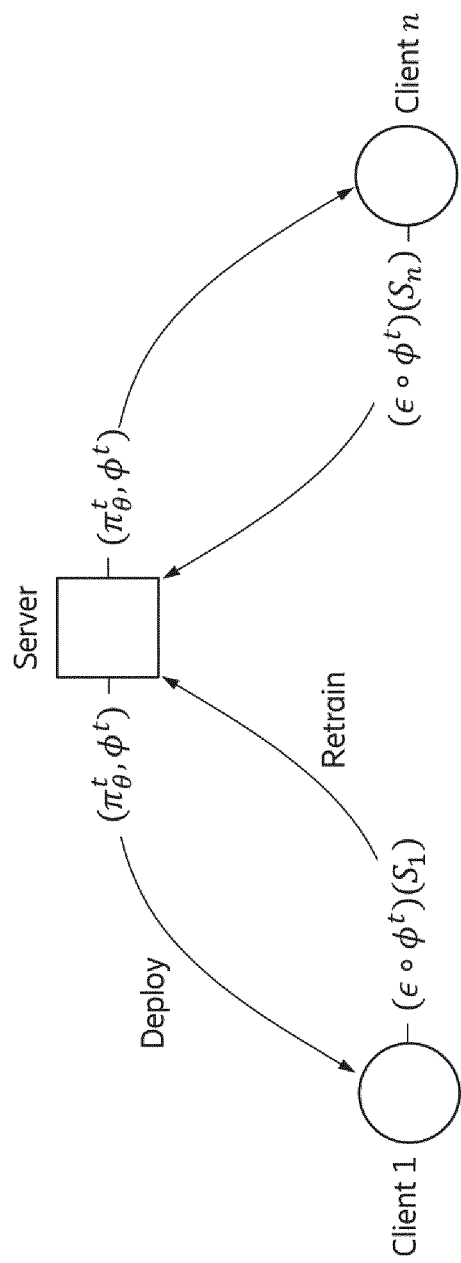

In some aspects of embodiments, as illustrated by the example shown in the process diagram of FIG. 6A, the server deploys a policy $\pi_\theta^t$ to one or more client nodes i at time t, wherein the policy is based on system parameters $\theta$, which are set during training. In addition to deploying the policy, the server also deploys a state classification model $\phi^t$ to one or more client nodes, typically the same client nodes to which the policy $\pi_\theta^t$ is deployed. The example in FIG. 6A shows the policy and state classification model being deployed to client 1 and client n (at time t). The client nodes having received the state classification model can then use the model to locally (at the client nodes) to identify one or more critical states as discussed above. When the client nodes subsequently send a retraining request to the server, this retraining request may then include samples S of the critical states identified. In the example of FIG. 6A, client 1 includes samples $S_1$ in a retraining request to the server, and client n includes samples $S_n$ in a retraining request to the server. The samples S may comprise one or more (potentially all) of the critical states identified by the clients. In this example, when the server subsequently receives the retraining request (see step S305) comprising samples, the samples may then be used to generate simulation parameters (for example, using a parameter generation model as discussed above) to retrain the MLS as shown in step S306. The retrained MLS may then generate a new policy. The state classification model may also be retrained. The server may then deploy (see step S307) the new policy $\pi_\theta^{t+1}$ and the new state classification model $\phi^{t+1}$ to the client nodes.

In further aspects of embodiments, as illustrated by the example shown in the process diagram of FIG. 6B, the server again deploys a policy $\pi_\theta^t$ to one or more client nodes i at time t, wherein the policy is based on system parameters θ. Similarly to the example shown in FIG. 6A, the client nodes (client 1 and client n) may then use the state classification model to identify one or more critical states. Prior to sending a sample of identified critical states to the server, the client node may then encrypt the sample before sending a retraining request including the encrypted sample to the server. Any suitable means may be used to encrypt the sample; in the example illustrated in FIG. 6B an encoding function ϵ is used to encrypt the sample at the client nodes, before the sample is sent to the server (see step S302). The encryption may also comprise modifying the sample of identified critical states in such a way that private information is obscured while the distribution of the data in the sample is maintained, for example, using differential privacy techniques. Alternatively or additionally, the sample of critical states may be encoded using a Bayesian network or Generative Adversarial Network (GAN), such that the data representative of the critical states may be retrieved and used by the server but the original data cannot be retrieved by the server. When the server receives the encrypted sample in the retraining request, as shown in step S305, the server decrypts the sample to obtain the critical states, before using the decrypted samples to generate a new policy (step S306) before initiating deployment (step S307) of new policy $\pi_\theta^{t+1}$ and the new state classification model $\phi^{t+1}$ to the client nodes. Encrypting the samples before sending in this way may help to satisfy privacy preserving requirements which may exist in some systems, for example, in telecommunications networks wherein the state of the environment (a network state) may be considered confidential information.

Figure 6C:
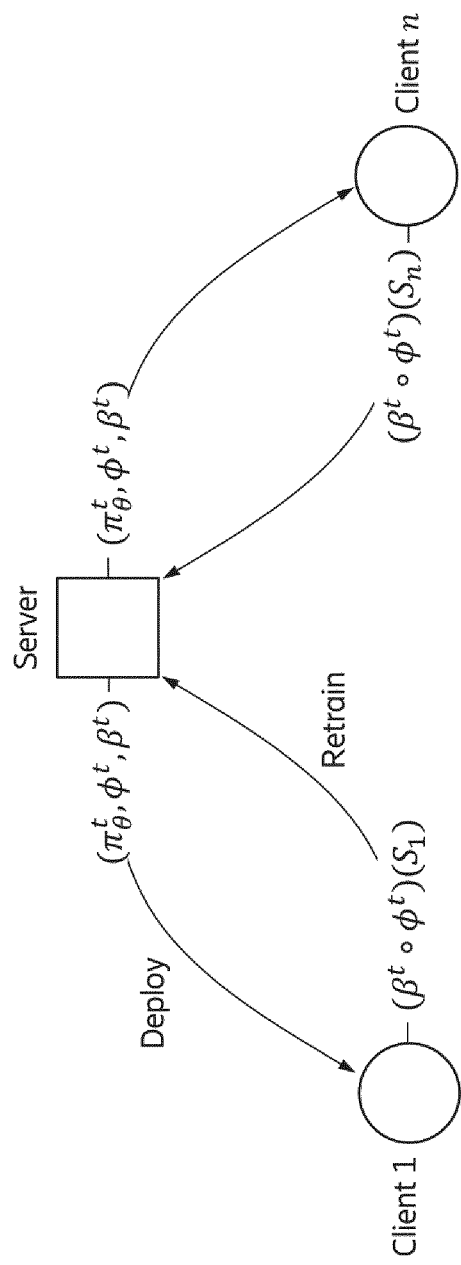

Further aspects of embodiments may use different techniques to help satisfy privacy preserving requirements. As illustrated by example in FIG. 6C, the information in the retraining request from a client node to a server may be information other than a sample of critical states (as is the case in the examples shown in FIG. 6A and FIG. 6B). In the example of FIG. 6C, the server deploys a policy $\pi_\theta^t$ to one or more client nodes i at time t, wherein the policy is based on system parameters θ. In addition to deploying the policy, the server also deploys a state classification model $\phi^t$ to one or more client nodes, typically the same client nodes to which the policy $\pi_\theta^t$ is deployed. The server further deploys a parameter generation model, such as a BayesSim model $\beta^t$, to one or more client nodes, typically the same client nodes to which the policy $\pi_\theta^t$ is deployed. The client nodes may therefore receive a triple ($\pi_\theta^t$, $\phi^t$, $\beta^t$) from the server. When the client nodes subsequently identify one or more critical states, these critical states may then be used in conjunction with the parameter generation model $\beta^t$ to infer simulation parameters, and these inferred simulation parameters may then be included in the retraining request to the server. By deriving the simulation parameters at the client nodes, the identified critical state samples can be retained at the client node rather than being sent to the server, which may satisfy privacy concerns regarding the state information. In this example, the server deploys (see step S307) a new policy $\pi_\theta^{t+1}$, new state classification model $\phi^{t+1}$ and new parameter generation model $\beta^{t+1}$ to the client nodes.

An overview of the aspects of embodiments discussed above with reference to FIGS. 6A to 6C is provided by the flowchart of FIG. 7. The flowchart begins, at step S701, with the server sending a policy $\pi_\theta^t$ (and potentially also a state classification model $\phi^t$ and/or parameter generation model $\beta^t$) to a client node, and the client node applies the policy. Subsequently, at step S702, the client node identifies one or more critical states using the state classification model $\phi^t$. If an encoding function is used to encrypt the critical states (as in the example shown in FIG. 6B) or another encryption means as discussed above, then the critical states may be encoded at step S703—True. Otherwise, if no encryption is used (S703—False), then the method proceeds to step S704 with unencrypted critical states. At step S704, if the parameter generation model $\beta^t$ is available at the client node (S704—True, as in the example shown in FIG. 6C) then simulation parameters may be inferred and these inferred simulation parameters sent to the server in a retraining request. If a parameter generation model $\beta^{t+1}$ is not available at the client node (S704—False), then the critical states may be sent in the retraining request either encoded or not depending on whether S703 was True or False. Finally, at S705, the server receives the retraining request and retrains the MLS to generate policy $\pi_\theta^{t+1}$ (and potentially also state classification model $\phi^{t+1}$ and/or parameter generation model $\beta^{t+1}$).

When a new policy (and potentially new state classification model and/or new parameter generation model) have been generated by the server, the server then performs deployment. The distribution of the new policy (and potentially new state classification model and/or new parameter generation model) is shown in step S307 of FIG. 3B. The step of distributing the new policy may be performed in accordance with a computer program stored in a memory 502, executed by a processor 501 in conjunction with one or more interfaces 503, as illustrated by FIG. 5A. Alternatively, the step of distributing the new policy may be performed by a distributor 553 as shown in FIG. 5B. The nature of the deployment varies between systems, and may also vary between client nodes within a system.

For some client nodes, the server may provide a periodic update of the policy; the period of the update may also be dependent upon the nature of the system; for systems where the environment develops rapidly periodic updates may be provided on an hourly basis, while for systems that vary over longer time frames the policy updates may be provided weekly or over an even longer time frame. Where periodic updates are used, the update timing may be scheduled for a period when the client nodes typically experience comparatively low demand, for example, for a telecommunications network wherein the client nodes are or form part of base stations, the periodic updates may occur at 3:00 am local time when the level of communications traffic experienced by base stations would typically be quite low.

For some client nodes, the server may provide on demand updates of the policy. The client node may then receive an updated policy when the client node requests the policy from the server. The client node may request the policy when sending the retraining request, for example, the client node may indicate an occasion in the future when the client node will be available to receive an updated policy. Alternatively, the client node may send a further communication to the server requesting a policy update.

For some client nodes, the server may provide policy updates on an opportunistic basis, based on a current state of the server and the client node. These opportunistic updates may be provided whenever both the server and client node are in a suitable state. As an example of this, the server may monitor or may receive updates detailing a current workload of the client node. When the server (that has a policy update to provide and is in a suitable state) determines that the client node has a low workload, the server may provide the policy update. Where a server is connected to a plurality of client nodes, the policy update may be provided to all of the client nodes simultaneously.

As shown in step S303 of FIG. 3A, the one or more client nodes receive the new policy from the server. The step of receiving the new policy may be performed in accordance with a computer program stored in a memory 402, executed by a processor 401 in conjunction with one or more interfaces 403, as illustrated by FIG. 4A. Alternatively, the step of receiving the new policy may be performed by a receiver 453 as shown in FIG. 4B. The one or more client nodes then instruct actions based on the received new policy, as shown in step S304. The step of instructing actions may be performed in accordance with a computer program stored in a memory 402, executed by a processor 401 in conjunction with one or more interfaces 403, as illustrated by FIG. 4A. Alternatively, the step of instructing actions may be performed by an instructor 454 as shown in FIG. 4B. As discussed above, the nature of the actions instructed is dependent on the environment in which the system operates.

Typically, following a policy update, the client nodes continue monitoring the environment to identify further critical states, that is, critical states for which the actions instructed in accordance with the new policy may not be reliable. If a client node identifies a further critical state, a further retraining request may subsequently be sent and the method of FIG. 3A and FIG. 3B may be repeated. The iterative nature of the method is illustrated by FIG. 8. For simplicity, FIG. 8 illustrates an aspect of an embodiment in which a server and a single client node are present, and in which retraining occurs when a single retraining request is received by the server from the client node. FIG. 8 begins at time t−1, with a retrain request sent to the server. The server performs the retraining of the MLS and provides new policy $\pi_\theta^t$ to the client i, which implements the policy. At some point after implementing policy $\pi_\theta^t$ the client i then identifies a critical state, and sends a further retraining request to the server, which retrains the MLS and provides new policy $\pi_\theta^{t+1}$ to the client i, which implements the policy. At some point after implementing policy $\pi_\theta^{t+1}$ the client i then identifies a critical state, and sends a further retraining request to the server, and the iterative process continues.

As an example of how aspects of embodiments may be implement, in an example implementation the client node may be a base station (or part of a base station) used in the environment of a telecommunications network, and the server may be all or part of a core network node. The client nodes may make measurements that allow the current state of the network to be observed (network throughput, round trip time (RTT), packet losses, and so on); these measurements may constitute all or part of an observation of the network. When creating policies for such client nodes, simulation parameters taken into consideration by the server may include the sizes of queues, number of UEs competing for base station resources, any bottlenecks in the network, and so on. The choice of such simulation parameters induce the state distributions observed by the agent during training. Therefore, they define the range of the observations for which the agent will be prepared to act after deployment. The server would produce a policy to map observations (network throughput, round trip time (RTT), packet losses, and so on) to actions $\alpha$ that would lead to good performance. The same observations would be used to train a parameter generation model and a state classification model. If a base station subsequently observes a network state which is not provided for, for example a RTT which is much higher than expected, the base station may identify this as a critical state and the procedures discussed above may be implemented.

As a consequence of the identification of critical environment states and updating of policies, systems in accordance with aspects of embodiments (including systems implemented in telecommunications networks) may adapt to evolving operational environments, and provide reliable actions over an extended duration. Further, as policies may be shared across multiple client nodes, a given client node may be prepared for environment states which have not previously been observed by that client node (where such a state has been observed by another client node and policies generated accordingly); the resilience of the system is thereby improved. Also, as the policies are generated at a server and then distributed to client nodes, the client nodes themselves are not required to possess the capability to generate policies, which may allow simplified client nodes to be used.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure. For the avoidance of doubt, the scope of the disclosure is defined by the claims.

The invention claimed is:

1. A method of operation of a client node for implementing reinforcement learning, RL, the client node instructing actions in an environment in accordance with a policy, the method comprising:
   identifying one or more critical states of the environment for which a current policy provides unreliable actions, the unreliable actions being actions that do not have predefined effects on the environment;
   initiating transmission to a server of a retraining request, the retraining request comprising information relating to the one or more critical states, the server retraining a machine learning system, MLS, responsible for the current policy, based on the information relating to the one or more critical states in the retraining request, to generate a new policy;
   receiving from the server the new policy, the new policy being generated by the server using RL based on the information relating to the one or more critical states; and
   instructing actions in the environment in accordance with the new policy.

2. A method of operation of a system comprising a client node and a server for implementing RL, the method comprising:
   by the client node:
      identifying one or more critical states of an environment for which a current policy provides unreliable actions, the unreliable actions being actions that do not have predefined effects on the environment;
      initiating transmission to a server of a retraining request, the retraining request comprising information relating to the one or more critical states;
      receiving from the server a new policy, the new policy being generated by the server using RL based on the information relating to the one or more critical states; and
      instructing actions in the environment in accordance with the new policy; and
   by the server:
      receiving the retraining request from the client node;
      retraining a machine learning system, MLS, responsible for the current policy, based on the information relating to the one or more critical states in the retraining request, to generate the new policy; and
      distributing the new policy generated by the MLS to the client node.

3. A client node for implementing reinforcement learning, RL, the client node being configured to instruct actions in an environment in accordance with a policy, the client node comprising processing circuitry and a memory containing instructions executable by the processing circuitry, whereby the client node is configured to:
   identify one or more critical states of the environment for which a current policy provides unreliable actions, the unreliable actions being actions that do not have predefined effects on the environment;
   initiate transmission to a server of a retraining request, the retraining request comprising information relating to the one or more critical states, the server retraining a machine learning system, MLS, responsible for the current policy, based on the information relating to the one or more critical states in the retraining request, to generate a new policy;

receive from the server the new policy, the new policy being generated by the server using RL based on the information relating to the one or more critical states; and instruct actions in the environment in accordance with the new policy.

4. The client node of claim 3, wherein critical states of the environment are states that are different from all of the environment states used to generate the current policy.

5. The client node of claim 4, wherein the client node is further configured to identify the critical state based on observations of the environment.

6. The client node of claim 5, wherein the client node is further configured to identify the critical state via comparisons of the environment with environment states used to generate the current policy.

7. The client node of claim 6, wherein the client node is further configured to use Random Network Distillation, RND, techniques in the comparison.

8. The client node of claim 5, wherein the client node is further configured to identify the critical state based on centralised information provided by the server.

9. The client node of claim 3, wherein the client node is further configured to identify the critical state of the environment using a state classification model.

10. The client node of claim 9, wherein the retraining request includes a sample of the one or more critical states.

11. The client node of claim 10, wherein the client node is further configured to encrypt the sample before initiating transmission of the retraining request.

12. The client node of claim 3, wherein the client node is further configured to use the identified one or more critical states to infer simulation parameters, and to include the inferred simulation parameters in the retraining request.

13. The client node of claim 3, wherein the client node is further configured to receive the current policy from the server, or configured to be loaded with the current policy before connection to the server.

14. The client node of claim 3, wherein the environment is at least a part of a telecommunications network.

15. The client node of claim 14, wherein the client node is comprised within a base station of the telecommunications network.

16. The client node of claim 14, wherein the client node is further configured to instruct actions comprising at least one of: modification of a packet transmission rate; and delaying packets.

17. A system comprising:
a client node for reinforcement learning, RL, and configured to instruct actions in an environment in accordance with a policy, the client node comprising processing circuitry and a memory containing instructions executable by the processing circuitry, the client node being configured to:
identify one or more critical states of the environment for which a current policy provides unreliable actions, the unreliable actions being actions that do not have predefined effects on the environment;
initiate transmission to a server of a retraining request, the retraining request comprising information relating to the one or more critical states;
receive from the server a new policy, the new policy being generated by the server using RL based on the information relating to the one or more critical states; and
instruct actions in the environment in accordance with the new policy; and
a server, the server comprising processing circuitry and a memory containing instructions executable by the processing circuitry, the server being configured to:
receive the retraining request from the client node;
retrain a machine learning system, MLS, responsible for the current policy, based on the information relating to the one or more critical states in the retraining request, to generate the new policy; and
distribute the new policy generated by the MLS to the client node.

18. The system of claim 17, wherein the server is further configured to: maintain a state classification model; update the state classification model when the MLS is retrained; and distribute the updated state classification model with the new policy.

19. The system of claim 18, wherein the information relating to the one or more critical states in the retraining request comprises inferred simulation parameters, and wherein the server is further configured to retrain the MLS using the inferred simulation parameters.

20. The system of claim 17, wherein distributing the new policy is performed one or more of:
with a preset periodicity;
when requested by the client node; and
based on a current state of the server and client node.

21. The system of claim 17, wherein the system comprises a plurality of client nodes, and wherein distributing the new policy comprises distributing the policy to all of the plurality of client nodes.

22. The system of claim 21, wherein the new policy is distributed to all of the plurality of client nodes simultaneously.

23. The system of claim 21, wherein server is configured to retrain the MLS when a certain number of retraining requests have been received from the plurality of client nodes, and to use information relating to the one or more critical states from all of the received retraining requests in the retraining of the MLS.

24. The system of claim 23, wherein the certain number is 1.

25. A computer-readable storage medium comprising instructions which, when executed on a computer, cause the computer to perform a method for implementing reinforcement learning, RL, in an environment in accordance with a policy, the method comprising:
identifying one or more critical states of the environment for which a current policy provides unreliable actions, the unreliable actions being actions that do not have predefined effects on the environment;
initiating transmission to a server of a retraining request, the retraining request comprising information relating to the one or more critical states, the server retraining a machine learning system, MLS, responsible for the current policy, based on the information relating to the one or more critical states in the retraining request, to generate a new policy;
receiving from the server the new policy, the new policy being generated by the server using RL based on the information relating to the one or more critical states; and
instructing actions in the environment in accordance with the new policy.

* * * * *